(12) United States Patent
Zhang et al.

(10) Patent No.: US 12,223,695 B2
(45) Date of Patent: Feb. 11, 2025

(54) TARGET-ORIENTED REINFORCEMENT LEARNING METHOD AND APPARATUS FOR PERFORMING THE SAME

(71) Applicant: SEOUL NATIONAL UNIVERSITY R&DB FOUNDATION, Seoul (KR)

(72) Inventors: Byoung-Tak Zhang, Seoul (KR); Kibeom Kim, Seoul (KR); Minsu Lee, Seongnam-si (KR); Min Whoo Lee, Yongin-si (KR); Yoonsung Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 463 days.

(21) Appl. No.: 17/427,957

(22) PCT Filed: Dec. 8, 2020

(86) PCT No.: PCT/KR2020/017859
§ 371 (c)(1),
(2) Date: Aug. 3, 2021

(87) PCT Pub. No.: WO2022/080582
PCT Pub. Date: Apr. 21, 2022

(65) Prior Publication Data
US 2022/0398830 A1    Dec. 15, 2022

(30) Foreign Application Priority Data
Oct. 12, 2020 (KR) .......................... 10-2020-0131334

(51) Int. Cl.
*G06V 10/776* (2022.01)

(52) U.S. Cl.
CPC ........ *G06V 10/776* (2022.01); *G06V 2201/07* (2022.01)

(58) Field of Classification Search
CPC .. G06V 10/776; G06V 2201/07; G06V 10/40; G06N 20/00
See application file for complete search history.

(56) References Cited

FOREIGN PATENT DOCUMENTS

| JP | 2017-102755 A | 6/2017 |
|---|---|---|
| KR | 10-2019-0069582 A | 6/2019 |
| KR | 10-2020-0094655 A | 8/2020 |

OTHER PUBLICATIONS

"Piotr Wojciech Mirowski et. al., Learning to Navigate in Complex Environments, Nov. 2016, International Conference on Learning Representations, Computer Science" (Year: 2018).*

(Continued)

*Primary Examiner* — Andrae S Allison
*Assistant Examiner* — Phuong Hau Cai
(74) *Attorney, Agent, or Firm* — Sughrue Mion, PLLC

(57) ABSTRACT

A target-oriented reinforcement learning method according to an embodiment includes: collecting data related to the target of reinforcement learning as target data in the process of performing the reinforcement learning; learning the collected target data as auxiliary learning for the reinforcement learning; and incorporating the results of the learning of the target data into the performance of the reinforcement learning.

4 Claims, 5 Drawing Sheets

(56) References Cited

OTHER PUBLICATIONS

"Kim, Kibeom et. al. Learning with target classification auxiliary task or semantic navigation, 2019, proceedings of Korea Institute of Information Scientists and Engineers" (Year: 2019).*

"Martin Riedmiller et. al., Learning by Playing Solving Sparse Reward Tasks from Scratch, 2018, Proceedings of the 35th International Conference on Machine Learning, PMLR 80" (Year: 2018).*

Max Jaderberg et al., "Reinforcement Learning With Unsupervised Auxiliary Tasks", arXiv:1611.05397v1, Nov. 2016, 14pages.

Guillaume Lample et al., "Playing FPS Games with Depp Reinforcement Learning", arXiv:1609.05521v1, Sep. 2016, 7pages.

Xiujun Li et al., "Recurrent Reinforcement Learning: A Hybrid Approach", arXiv:1509.03044v1, Sep. 2015, 8pages.

Vitchyr Pong et al., "Visual Reinforcement Learning with Imagined Goals", Berkeley Artificial Intelligence Research, Sep. 6, 2018, 8pages.

International Search Report for PCT/KR2020/017859 dated Jul. 12, 2021 [PCT/ISA/210].

Shindo Tomonori, "Continuous value based motion can be acquired by deep learning, CNN and reinforcement learning for robot behavior generation", NIKKEI Robotics, Jul. 2016, No. 12, pp. 14-19 (8 pages total).

* cited by examiner

TARGET-ORIENTED REINFORCEMENT LEARNING METHOD AND APPARATUS FOR PERFORMING THE SAME

CROSS REFERENCE TO RELATED APPLICATIONS

This application is a National Stage of International Application No. PCT/KR2020/017859 filed Dec. 8, 2020, claiming priority based on Korean Patent Application No. 10-2020-0131334 filed Oct. 12, 2020.

TECHNICAL FIELD

The embodiments disclosed herein relate to a target-oriented reinforcement learning method for additionally performing learning on a target in order to increase the efficiency of reinforcement learning, and an apparatus for performing the same.

This study was conducted as a research result of the ICT Convergence Industry Fundamental Technology Development Project sponsored by the Korean Ministry of Science and ICT and the Institute of Information & Communications Technology Planning & Evaluation (IITP-2018-0-00622-003).

This study was conducted as a research result of the Industrial Technology International Cooperation Project sponsored by the Korean Ministry of Trade, Industry and Energy and the Korea Institute for Advancement of Technology (KIAT-P0006720).

This study was conducted as a research result of the SW Computing Industry Fundamental Technology Development Project sponsored by the Korean Ministry of Science and ICT and the Institute of Information & Communications Technology Planning & Evaluation (IITP-2015-0-00310-006).

This study was conducted as a research result of the Personal Basic Research Project sponsored by the Korean Ministry of Education and the National Research Foundation of Korea (NRF-2018R1D1A1B07049923).

BACKGROUND ART

Reinforcement learning is a learning method for selecting optimal actions in given states. In this case, a component that becomes a main agent of learning is referred to as an agent, and the agent establishes a policy for selecting actions in the direction in which rewards are maximized through learning.

According to general reinforcement learning, an agent repeats the process of learning what optimal actions are through exploration in the state in which it does not have information about a target. In other words, the agent undergoes a lot of trial and error because it performs countless actions, checks cases where a reward is obtained and cases where a reward is not obtained, and determines optimal actions according to results. Therefore, reinforcement learning has the problem of low efficiency. In addition, in a rare rewarding situation, a case where a reward is obtained itself rarely occurs, so that the effectiveness of reinforcement learning may be low.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to provide a method and apparatus for increasing the efficiency of learning by additionally performing learning on a target through target data that can be easily obtained in the process of performing reinforcement learning.

Technical Solution

In order to solve the above-described technical problem, in the embodiments disclosed herein, learning on the target of reinforcement learning is performed using data collected in the process of performing reinforcement learning, and reinforcement learning is performed with the results of learning incorporated into the reinforcement learning.

Advantageous Effects

According to any one of the above-described technical solutions, fast and efficient learning is supported by performing learning on target data while performing reinforcement learning, thereby expecting the effect of increasing the effectiveness and efficiency of reinforcement learning.

Furthermore, according to any one of the above-described technical solutions, information about a target is acquired by performing learning through target data that can be easily obtained in the process of performing a general reinforcement learning model, thereby providing the advantage of efficiently increasing the effect of reinforcement learning.

The effects that can be obtained by the embodiments disclosed herein are not limited to the above-described effects, and other effects that have not been described above will be clearly understood by those having ordinary skill in the art, to which the present invention pertains, from the following description.

BEST MODE

Figure 1:
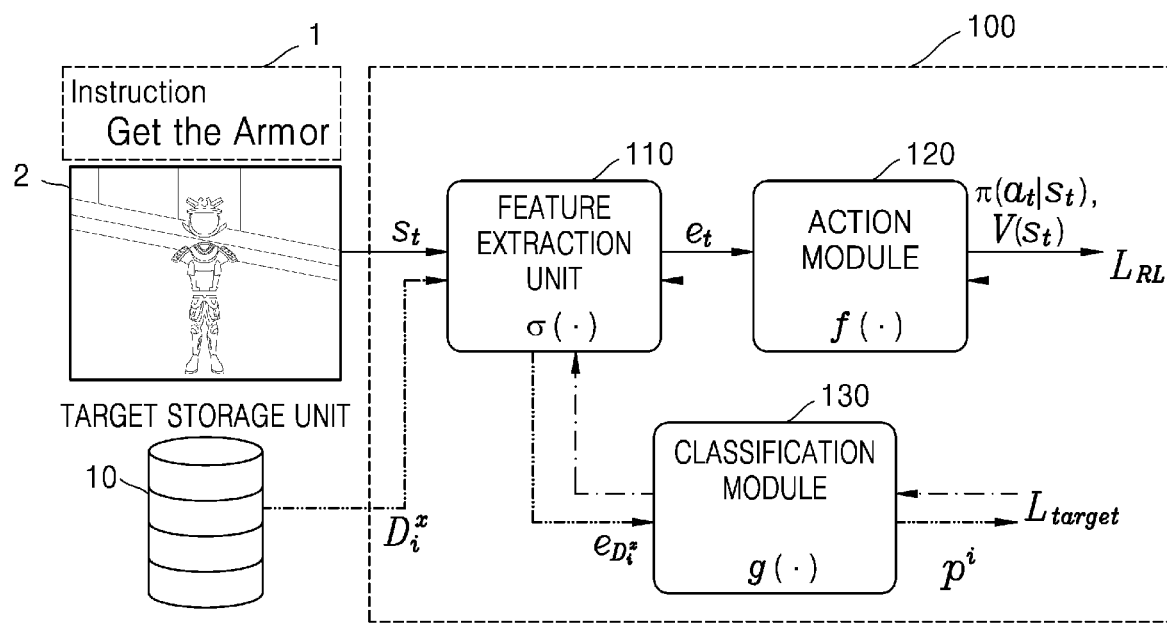
FIG. 1 is a diagram showing a model for performing target-oriented reinforcement learning according to an embodiment.

As a technical solution for overcoming the above technical problem, according to an embodiment, there is disclosed a target-oriented reinforcement learning method including: collecting data related to the target of reinforcement learning as target data in the process of performing the reinforcement learning; learning the collected target data as auxiliary learning for the reinforcement learning; and incorporating the results of the learning of the target data into the performance of the reinforcement learning.

According to another embodiment, there is disclosed a computer program for performing a target-oriented reinforcement learning method, wherein the target-oriented reinforcement learning method includes: collecting data related to the target of reinforcement learning as target data in the process of performing the reinforcement learning; learning the collected target data as auxiliary learning for the reinforcement learning; and incorporating the results of the learning of the target data into the performance of the reinforcement learning.

According to still another embodiment, there is disclosed a computer-readable storage medium having stored thereon a program for performing a target-oriented reinforcement learning method, wherein the target-oriented reinforcement learning method includes: collecting data related to the target of reinforcement learning as target data in the process of performing the reinforcement learning; learning the collected target data as auxiliary learning for the reinforcement learning; and incorporating the results of the learning of the target data into the performance of the reinforcement learning.

According to still another embodiment, there is disclosed a computing device for performing target-oriented reinforcement learning, the computing device including: an input/output unit configured to receive data and output the result of the performance of an operation; a storage unit configured to store a program for performing reinforcement learning and target data collected in the process of performing the reinforcement learning; and a control unit including at least one processor, and configured to perform reinforcement learning using data received through the input/output unit by executing the program; wherein a target-oriented reinforcement learning model implemented in such a manner that the control unit executes the program collects data related to a target of reinforcement learning as target data in the process of performing the reinforcement learning, learns the collected target data as auxiliary learning for the reinforcement learning, and incorporates the results of the learning of the target data into the performance of the reinforcement learning.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

First, the meanings of the terms frequently used herein are defined.

The 'target task' refers to a task that is rewarded when an agent achieves it, and the 'target data' refers to data related to a target and obtained in a process in which an agent performs reinforcement learning. In the embodiments described herein, it is assumed that a target image is used as target data, and specific examples of the target data and the target image and a specific method for collecting target data will be described in detail below.

The 'target-oriented reinforcement learning' is a novel reinforcement learning method proposed herein, and refers to a learning method that allows an agent to acquire information about a target by performing learning on target data together with general reinforcement learning.

The 'auxiliary learning' or 'auxiliary task' refers to the process of forming information, directly or indirectly obtained in the process of performing a main task to be learned in one deep learning model, into outputs and learning the outputs together with the main task. The use of auxiliary learning may aid in learning the deep layer of a model by additionally acquiring a gradient, or may aid in learning a main task by learning additional information.

Terms that are not defined above will be defined below whenever necessary.

Embodiments will be described in detail below with reference to the accompanying drawings.

Figure 2:
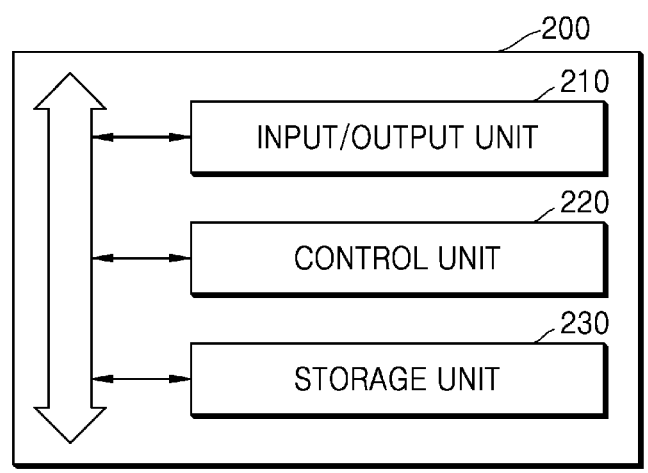
FIG. 2 is a diagram showing the configuration of a computing device for performing target-oriented reinforcement learning according to an embodiment.

FIG. 1 is a diagram showing a model for performing target-oriented reinforcement learning according to an embodiment, and FIG. 2 is a diagram showing the configuration of a computing device for performing target-oriented reinforcement learning according to an embodiment.

The model shown in FIG. 1 may be implemented in such a manner that the control unit 220 of the computing device 200 of FIG. 2 executes a program stored in a storage unit 230. In the following, components included in the computing device 200 will be briefly described, and then a method of performing target-oriented reinforcement learning through the reinforcement learning model shown in FIG. 1 will be described in detail.

Referring to FIG. 2, the computing device 200 according to the embodiment may include an input/output unit 210, the control unit 220, and the storage unit 230.

The input/output unit 210 is a component configured to receive user commands or data related to reinforcement learning and output the results of the performance of reinforcement learning. The input/output unit 210 may include various types of input devices (e.g., a keyboard, a touch screen, etc.) for receiving input from the user. Furthermore, it may include a connection port or communication module for transmitting and receiving data used for reinforcement learning and reinforcement learning result data.

The control unit 220 is a component including at least one processor such as a CPU, and performs reinforcement learning according to a process presented below by executing the program stored in the storage unit 230. In other words, the target-oriented reinforcement learning model 100 shown in FIG. 1 is implemented in such a manner that the control unit 220 executes the program stored in the storage unit 230, and the control unit 220 performs reinforcement learning through the target-oriented reinforcement learning model 100. A method by which the control unit 220 performs reinforcement learning using the target-oriented reinforcement learning model 100 will be described in detail with reference to FIG. 1 below.

The storage unit 230 is a component configured such that a file and a program can be stored therein, and may be constructed via various types of memory. In particular, the storage unit 230 may store data and a program that enable the control unit 220 to perform operations for target-oriented reinforcement learning according to the process presented below. Furthermore, target images collected in the process of performing reinforcement learning are labeled and stored in the storage unit 230, and may be used for learning.

A process in which the control unit 220 performs target-oriented reinforcement learning according to an embodiment by executing a program stored in the storage unit 230 will be described in detail below with reference to FIG. 1.

As described above, the target-oriented reinforcement learning model 100 is implemented in such a manner that the control unit 220 executes the program stored in the storage unit 230. Accordingly, the operations or processes described as being performed by the target-oriented reinforcement learning model 100 in the following embodiments may be viewed as being performed by the control unit 220 in reality. Furthermore, detailed components included in the target-oriented reinforcement learning model 100 may be viewed as software units that take charge of specific functions or roles in the overall program for performing target-oriented reinforcement learning.

Referring to FIG. 1, the target-oriented reinforcement learning model 100 according to the embodiment may include a feature extraction unit 110, an action module 120, and a classification module 130.

The feature extraction unit 110 is a component configured to extract features from state data indicative of a state and target data. The feature extracted from the state data by the feature extraction unit 110 is transferred to the action module 120, and the feature extracted from the target data is transferred to the classification module 130.

The action module 120 may output an action and a value according to a policy based on the feature extracted from the state data. The classification module 130 may classify the target data based on the feature extracted from the target data. Specific operations performed by the feature extraction unit 110, the action module 120, and the classification module 130 will be described below with reference to equations.

The target-oriented reinforcement learning model 100 according to an embodiment may additionally include the classification module 130 composed of a multilayer perceptron in a general reinforcement learning model structure in which the feature extraction unit 110 is connected to the action module 120 configured to output a policy π and a value function V.

Accordingly, the feature extraction unit 110 and the action module 120 may be used when reinforcement learning is performed, and the feature extraction unit 110 and the classification model 130 may be used when the auxiliary task of learning target images is performed. In other words, a loss function for performing a main task may be executed by the action module 120, and an auxiliary loss function for determining a target image may be executed by the classification module 130.

Referring to FIG. 1, when an agent receives the instruction 1 "Get the Armor," an image 2 indicating a state $s_t$ at time t is applied as an input to the feature extraction unit 110.

The feature extraction unit 110 converts the state $s_t$ into encoded data $e_t$ according to Equation 1 below:

$$e_t = \sigma(s_t) \quad (1)$$

Then, the action module 120 outputs a policy π and a value function V from $e_t$ according to Equation 2 below:

$$(\pi(a_t|s_t), V(s_t)) = f(e_t) \quad (2)$$

where $a_t$ is an action performed by the agent at time t.

Furthermore, in this case, the function $f(\cdot)$ of the action module 120 and a resulting loss function $L_{RL}$ may vary depending on a selected reinforcement learning algorithm. For example, when an Asynchronous Advantage Actor-Critic (A3C) algorithm is selected, a loss function may be defined according to Equations 3 to 5 below:

$$L_P = \nabla \log \pi(a_t|s_t)(R_t - V(s_t)) + \beta H(\pi(s_t)) \quad (3)$$

$$L_v = (R_t - V(s_t))^2 \quad (4)$$

$$L_{RL} := L_{A3C} L_P + 0.5 \cdot L_v \quad (5)$$

where $L_P$ and $L_v$ are the loss of the policy and the loss of the value function, respectively, and $R_t$ is a return as the sum of rewards from the beginning to time t−1. H and β are an entropy term and an entropy coefficient, respectively.

The target-oriented reinforcement learning model 100 collects a target image in the process of performing reinforcement learning according to the algorithm described above, labels the collected target image, and stores it in a target storage unit 10. In this case, the target storage unit 10 may be a component that is included in the storage unit 230 of FIG. 2.

A process in which the target-oriented reinforcement learning model 100 collects a target image will be described in detail as follows. First, a method of collecting target data, which corresponds to a superordinate concept for a target image, will be described, and then a specific example of collecting a target image will be described.

The target-oriented reinforcement learning model 100 collects data related to the target of reinforcement learning as target data in the process of performing reinforcement learning. According to an embodiment, when an agent performing reinforcement learning succeeds in achieving a target, it collects an image including a visual representation of the target as target data (a target image), and the collected target data may be labeled to indicate that it corresponds to the target and then be stored.

More specifically, the target-oriented reinforcement learning model 100 collects data related to an event as target data when the event (e.g., the reaching of a target state) such as the acquisition of a reward or the success or failure of the performance of a specific task occurs. Thereafter, the target-oriented reinforcement learning model 100 labels the collected target data to indicate an event related to the target data, and then stores it in the target storage unit 10.

For example, when it is assumed that the agent becomes a character in a game and plays the game, the target-oriented reinforcement learning model 100 may collect a predetermined number of game screen frames (e.g., 60 to 70 frames before acquiring an item) before a specific event occurs in the game (e.g., before the agent obtains a specific item or performs a mission) as target images, may label the target images to indicate an event corresponding to the collected target images, and may store the target images in the target storage unit 10. In other words, the collected target images may include visual representations of a target.

According to one embodiment, when an event in which the agent achieves a target and receives a reward occurs in a game, i.e., when the performance of a target task is successful, the target-oriented reinforcement learning model 100 may store a predetermined number of game screen frames before the occurrence of the event as target images, and may label the stored target images to indicate that they correspond to a 'target.' The feature extraction unit 110 and the classification module 130 learn visual representations of the target through the stored target images. Accordingly, when the target is included in a game screen applied as a state, the feature extraction unit 110 may increase the performance and efficiency of reinforcement learning by effectively extracting a feature for the identification of the target.

A user may set in advance an event that causes the target-oriented reinforcement learning model 100 to collect target data. In other words, the target data may be viewed as a hyper-parameter designated by a user.

The target-oriented reinforcement learning model 100 may collect a plurality of target images in a trial and error process experienced while performing reinforcement learning.

The process of performing learning using collected target images will be described below. $D_i^x$ is the batch data of a target image of index i, and $D_i^y$ is the label of the corresponding data. In addition, the function of the classification module 130 is $g(\cdot)$, and $p_i$ is the predicted value of the classification module 130. While passing the target images through the feature extraction unit 110 and the classification module 130, the loss $L_{target}$ for an auxiliary task may be obtained according to Equations 6 to 8 below. The loss $L_{target}$ for an auxiliary task is only used during training.

$$e_{D_i^x} = \sigma(D_i^x) \quad (6)$$

$$p_i = g(e_{D_i^x}) \quad (7)$$

$$L_{target} = -\Sigma_{i=0}^M D_i^y \log(p_i) \quad (8)$$

In this case, M is the number of batches of target images.

When the loss $L_{RL}$ for the main task and the loss $L_{target}$ for the auxiliary task are obtained according to the above-described process, the target-oriented reinforcement learning model 100 obtains an overall loss function $L_{total}$ by multiplying the loss $L_{target}$ for the auxiliary task by a weight η smaller than 1, as in Equation 9 below, in order to focus on the learning of the main task. According to an embodiment, η may be set to a value between 0.3 and 0.5 according to the type of main task.

$$L_{total} = L_{RL} + \eta L_{target} \quad (9)$$

Through the above-described process, the target-oriented reinforcement learning model 100 may learn the visual representations of target images. In other words, the target-oriented reinforcement learning model 100 may learn how to determine an image representing a target or an image containing a target through the classification model 130. The feature extraction unit 110 may extract a feature related to a target from an image received as a state $s_t$ by using the results of the learning. In other words, when the agent performs an action, the performance and efficiency of learning may be improved by using information about the target.

In other words, the target-oriented reinforcement learning model 100 also learns the target data through the classification module 130 while learning the policy, so that the feature extraction unit 110 can classify a target more desirably. That is, it may be considered that the feature extraction unit 110 learns the visual representations of the target data through the auxiliary task.

Meanwhile, since the target images to be learned have been collected in the previous trial and error process, they are not used to output actions through the policy. In other words, the learning of target images using the feature extraction unit 110 and the classification module 130 is performed only during training.

Figure 3:
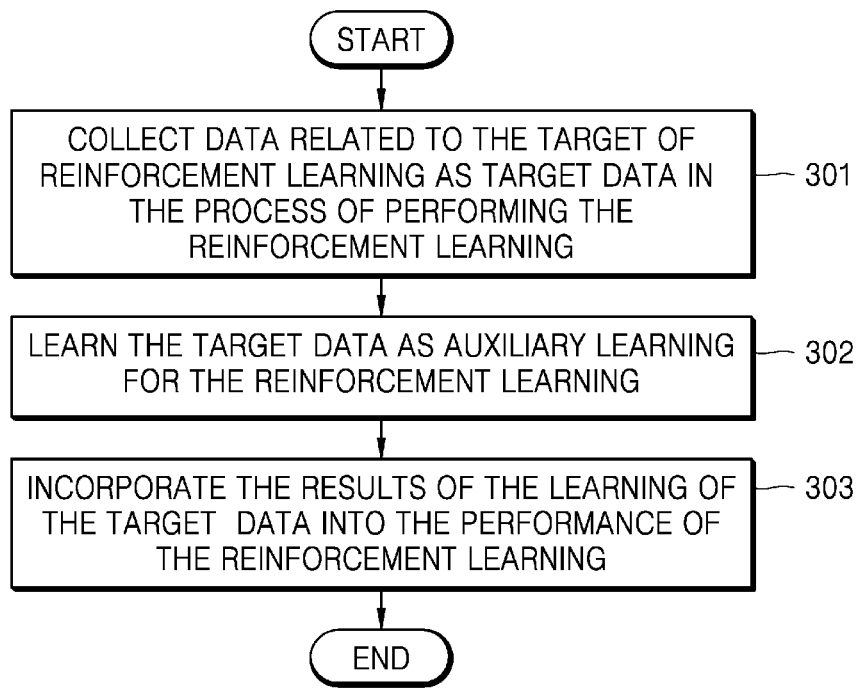
FIGS. 3 to 5 are flowcharts illustrating a target-oriented reinforcement learning method according to an embodiment.
Figure 4:
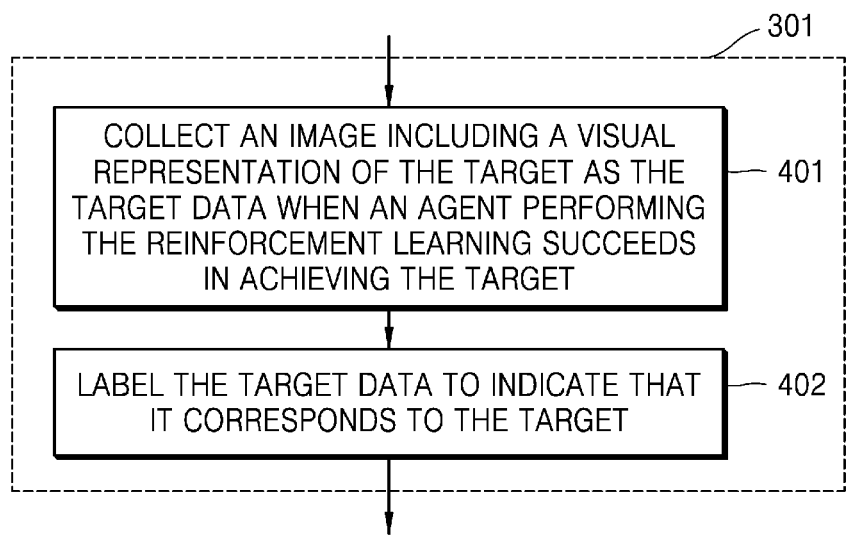
Figure 5:
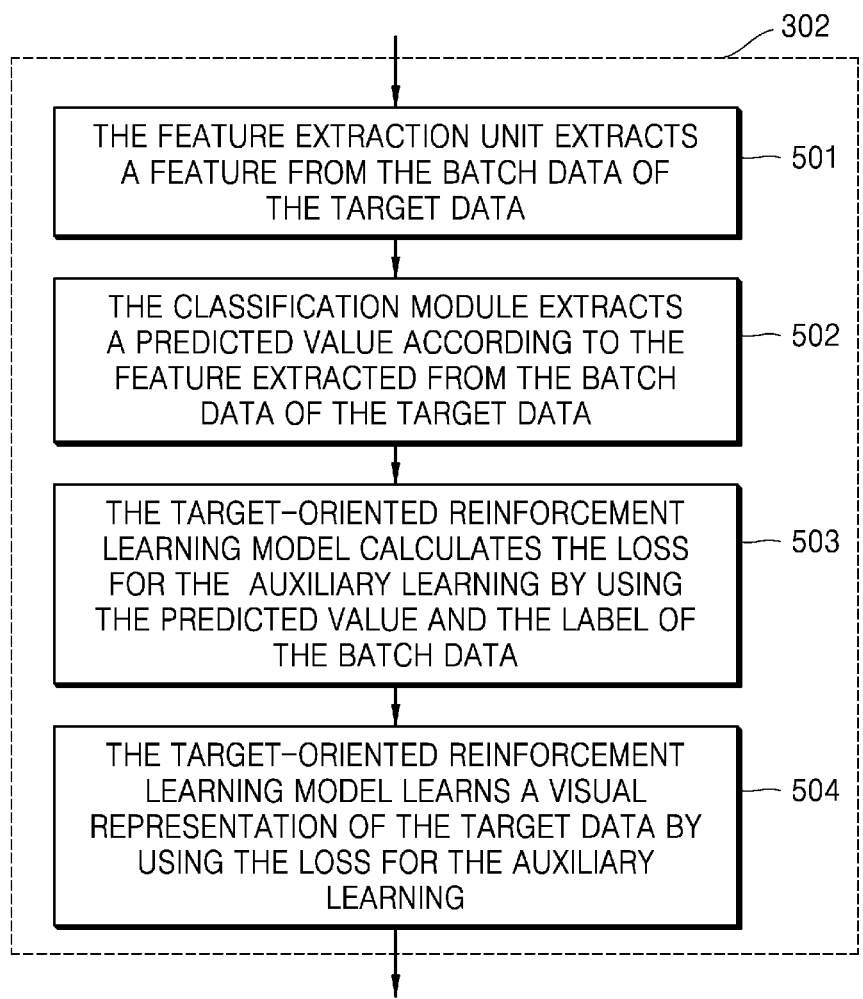

A method of performing target-oriented reinforcement learning using the above-described computing device 200 will be described below. FIGS. 3 to 5 are flowcharts illustrating a target-oriented reinforcement learning method according to an embodiment.

The target-oriented reinforcement learning method according to the embodiments shown in FIGS. 3 to 5 includes steps that are performed in a time-series manner in the computing device 200 shown in FIG. 2. Accordingly, the descriptions that are omitted below but are given above in conjunction with the computing device 200 of FIG. 2 may also be applied to the signal control method according to the target-oriented reinforcement learning method according to the embodiments shown in FIGS. 3 to 5.

Referring to FIG. 3, at step 301, the target-oriented reinforcement learning model 100 collects data related to a target of reinforcement learning as target data in the process of performing reinforcement learning.

FIG. 4 shows detailed steps included in step 301 of FIG. 3. Referring to FIG. 4, at step 401, when an agent performing reinforcement learning succeeds in achieving a target, the target-oriented reinforcement learning model 100 collects an image, including a visual representation of the target, as target data. At step 402, the target-oriented reinforcement learning model 100 performs labeling indicating that the target data corresponds to the target.

Referring back to FIG. 3, at step 302, the target-oriented reinforcement learning model 100 learns the target data as auxiliary learning for reinforcement learning.

FIG. 5 shows detailed steps included in step 302 of FIG. 3. Referring to FIG. 5, at step 501, the feature extraction unit 110 of the target-oriented reinforcement learning model 100 extracts a feature from the batch data of the target data. In step 502, the classification module 130 of the target-oriented reinforcement learning model 100 extracts a predicted value according to the feature extracted from the batch data of the target data. At step 503, the target-oriented reinforcement learning model 100 calculates the loss for the auxiliary learning using the predicted value and the label of the batch data. At step 504, the target-oriented reinforcement learning model 100 learns the visual representation of the target data by using the loss for the auxiliary learning. A specific method by which the target-oriented reinforcement learning model 100 learns the target data as auxiliary learning for reinforcement learning has been described with reference to Equations 6 to 8 above.

According to the above-described embodiments, a target image is collected in the process of performing reinforcement learning and the collected target image is additionally learned, so that fast and efficient learning is supported, thereby expecting the effect of increasing the performance and efficiency of reinforcement learning.

In general reinforcement learning, in order for an agent to learn a policy, it has to go through a lot of trial and error, and there is a problem in that the performance of learning is not high despite a lot of trial and error. According to the embodiments proposed herein, this problem may be overcome.

In addition, data collected in the process of performing reinforcement learning is used rather than adding external data in a learning process, thereby providing the advantage of enabling learning without external intervention.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The target-oriented reinforcement learning method according to the embodiments described via FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the target-oriented reinforcement learning method according to the embodiments described via FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the target-oriented reinforcement learning method according to the embodiments described via FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory.

Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A reinforcement learning method performed by a target-oriented reinforcement learning model, the reinforcement learning method comprising:
   collecting a data related to a target of the reinforcement learning as target data when an event in which an agent achieving the target and receiving a reward occurs, wherein the target data comprises a predetermined number of frame images before an occurrence of the event and a label indicating the target data corresponds to the target;
   learning the target data as auxiliary learning for the reinforcement learning; and
   incorporating results of the learning of the target data into performance of the reinforcement learning,
   wherein the target-oriented reinforcement learning model comprises:
      a feature extraction unit implemented by at least one processor and configured to extract features from state data and the target data;
      an action module implemented by the at least one processor and configured to output an action and a value according to a policy based on the feature extracted from the state data; and
      a classification module implemented by the at least one processor and configured to classify the target data based on the feature extracted from the target data, and
   wherein learning the collected target data comprises:
      extracting, by the feature extraction unit, a feature from batch data of the target data;

extracting, by the classification module, a predicted value according to the feature extracted from the batch data of the target data;

calculating, by the target-oriented reinforcement learning model, a loss for the auxiliary learning by using the predicted value and the label of the target data; and learning, by the target-oriented reinforcement learning model, the visual representation of the target data by using the loss for the auxiliary learning.

2. A computer-readable storage medium having stored thereon a program for performing the method set forth in claim 1.

3. A computer program performed by a computing device and stored in a medium in order to perform the method set forth in claim 1.

4. A computing device for performing target-oriented reinforcement learning, the computing device comprising:
an input device configured to receive data;
a memory configured to store a program for performing reinforcement learning and target data collected in a process of performing the reinforcement learning; and
at least one processor configured to perform the reinforcement learning using the data received through the input device by executing the program;
wherein a target-oriented reinforcement learning model implemented in such a manner that the at least one processor executes the program, collects data related to a target of the reinforcement learning as the target data in a process of performing the reinforcement learning when an event in which an agent achieving the target and receiving a reward occurs, wherein the target data comprises a predetermined number of frame images before an occurrence of the event and a label indicating the target data corresponds to the target, learns the target data as auxiliary learning for the reinforcement learning, and incorporates results of the learning of the target data into performance of the reinforcement learning, and wherein the target-oriented reinforcement learning model comprises:
a feature extraction unit implemented by the at least one processor and configured to extract features from state data and the target data;
an action module implemented by the at least one processor and configured to output an action and a value according to a policy based on the feature extracted from the state data; and
a classification module implemented by at least one processor and configured to classify the target data based on the feature extracted from the target data, and wherein when learning the collected target data, the target-oriented reinforcement learning model is operated such that the feature extraction unit extracts a feature from batch data of the target data, the classification module extracts a predicted value according to the feature extracted from the batch data of the target data, the target-oriented reinforcement learning model calculates a loss for the auxiliary learning by using the predicted value and the label of the target data, and the target-oriented reinforcement learning model learns the visual representation of the target data by using the loss for the auxiliary learning.

* * * * *